Dec. 15, 1959  C. O. PETERSON  2,917,328
BEARING SEALS
Filed Oct. 28, 1957

INVENTOR.
CARL O. PETERSON
BY
ATTORNEY

2,917,328

BEARING SEALS

Carl O. Peterson, Jamestown, N.Y., assignor to Marlin-Rockwell Corporation, Jamestown, N.Y., a corporation of Delaware Application October 28, 1957, Serial No. 692,888

2 Claims. (Cl. 286—5)

This invention relates to an improved seal for bearings or other relatively rotatable concentric members.

Particularly, the invention is directed to the provision of a seal of the labyrinth type wherein one element of the seal is carried by the rotatable member of a bearing and the other element of the seal, by the relatively fixed member of a bearing. The two elements of the seal, although out of direct contact with each other, however, cooperate to provide such interfitting portions as to retain lubricant contained within the bearing and prevent ingress of dirt or other foreign matter. It will, of course, be understood that the present illustration and description of the seal, as applied to a bearing having inner and outer members, is intended as a disclosure of one typical application of use.

The present invention has for one of its objects the provision of a labyrinth seal for bearings or other relatively rotatable concentric members in which one of the two sealing rings includes a resilient peripheral bead fitted into a recess in one of the members and means for positively retaining the bead within the recess.

It is another object of the invention to provide a labyrinth seal wherein the cooperating sealing rings are so designed as to enable use of a seal with bearings of relatively narrow width.

It is another object of the invention to provide a labyrinth seal for bearings that, by reason of its proportions, provides increased space for lubricant without any increase in the axial width of the bearings as a whole.

Another and important object of the invention lies in the provision of relatively rotatable sealing rings so designed that a much closer running clearance may be had without the possibility of wear of the rings by reason of frictional contact.

It is also an object of the invention that, through the elimination of distortion of either of the relatively rotatable rings of the seal, it is possible to utilize this seal in high speed bearings.

It is a further and important object of the invention to provide a reinforcement for the resilient ring that is of such proportions and arrangement as to preclude the possibility of permanent distortion of the ring as a result of installation or removal.

Other objects and advantages of the invention will be more fully understood from a consideration of the following specification, taken in conjunction with the accompanying drawing, in which.

Figure 1:
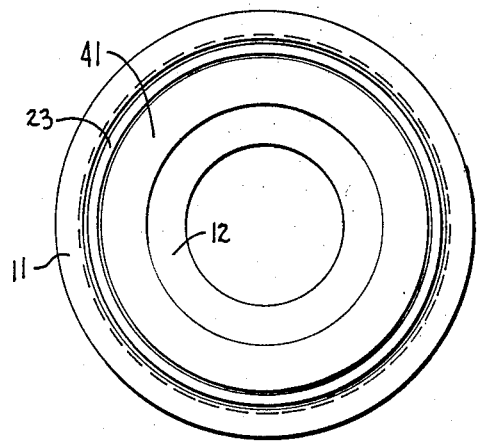
Fig. 1 is a side elevational view of a bearing fitted with sealing rings embodying one form of the invention.
Figure 2:
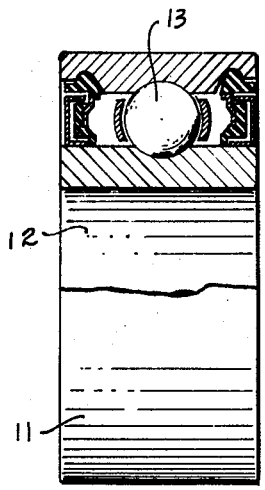
Fig. 2 is an enlarged edgewise view of the bearing shown in Fig. 1, being partly sectioned to disclose the general location and arrangement of the sealing rings at each edge of the bearing.
Figure 3:
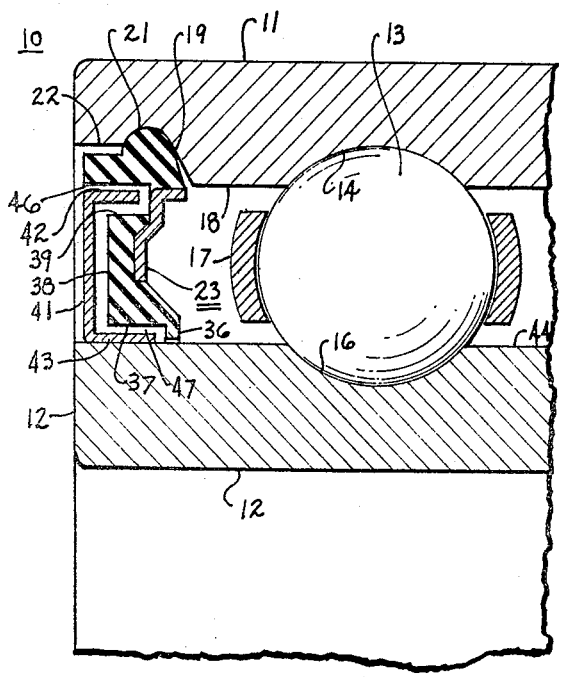
Fig. 3 is an enlarged fragmentary transverse vertical sectional view showing the mounted relationship of the inner and outer rings that constitute each seal.
Figure 4:
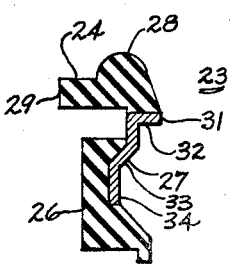
Fig. 4 is a vertical sectional view of the reinforced resilient sealing ring.

Referring more particularly to the drawing, the reference numeral 10 is employed to generally designate a bearing in which two-ring labyrinth seal, embodying the invention, is provided. The bearing shown includes an outer member 11 and inner member 12. Suitable balls 13 are located in grooves 14 and 16 of these members. The balls are held in their proper relationship by means of a retainer 17; this general arrangement of bearing members, balls, and retainer being common practice. The presently illustrated bearing shows that the balls 13 and retainer 17 are exposed to two sides of the bearing and such a bearing will therefore be provided with two seals. Inasmuch as these seals are identical, except for their reversed position, only one of them will be described in detail. The outer member 11, at each side of the groove 14, is formed with an inner face 18 which extends axially toward the side of the bearing. Adjacent this side, the face 18 is cut at an incline, as at 19, and terminates in a semi-circular recess 21. From the recess 21, there is a short inner face 22 which extends to the bearing edge. In other words, face 22 is located somewhat radially outwardly of face 18.

The ring 23, now to be considered, and which is intended to be secured within the recess 21, consists of two resilient parts 24 and 26 which are connected by a metal annulus 27. The part 24 includes a circumferential bead 28 and an axially directed flange or rim 29. Substantially directly beneath the bead 28, this portion is flat, as at 31, and is adhesively bonded to a flange or seat 32 which constitutes the circumferential surface of the annulus 27. The annulus 27 is non-resilient and, in order that it may properly support the resilient part 24, must be rigid and, to this end, it is formed with an axially, outwardly inclined portion 33 which continues in a radially, inwardly directed portion 34. The part 26 of the ring 23 is formed from resilient material and so designed as to have a portion of its axial inner surface contoured to fit the flanges 33 and 34 of the annulus. Radially inwardly of the annulus, this resilient part inclines axially inwardly and may include a lip 36. With the exception of the possible provision of the lip 36, the part 26 terminates in a surface 37 which, when this ring is installed, is parallel with the outer surface of the inner bearing member 12. The part 26 is adhesively bonded to the annulus along the surfaces above defined and, in addition to the innermost surface 37, is axially and radially outwardly defined by plane surfaces 38 and 39.

The other ring 41, that cooperates with the ring 23 to form the labyrinth seal embodying the invention, is formed with radially outer and inner flanges 42 and 43. Flange 43 is press fitted to the outer surface 44 of the inner bearing member 12.

To install the seal in a bearing of the general type shown, it is necessary to mount the outer part of ring 23 in what, in the present instance, is the fixed bearing member 11. The resilient bead 28 is compressed to move along the surface 22 axially inwardly of the bearing unitl it expands into the recess 21. Due to the fact that the annulus 27 is rigid, the extent to which the bead 28 is compressed to enter the recess 21 is insufficient to distort the annulus or to produce any coning of the part 24 or annulus, or both, during the installing operation. When the ring 23 has been installed, it will be noted that the inner surface of the flange 29, the edge portion of the annulus, and the outermost surface 39 of part 26 cooperate to form an axially outwardly opening groove 46. Also, it will be noted that the innermost surface 37 of the ring 23 cooperates with the outer surface 44 of the inner member 12 to provide a further axially outwardly opening groove 47.

The metal ring 41 is now press fitted onto the surface 44 of the inner bearing member 12, the inner flange 43 of this ring projecting into the groove 47, with the outer flange 42 projecting into groove 46. When the metal ring 41 is properly located, a narrow, substantially uniform width space is provided between the ring 41 and the adjacent parts of the ring 23. In other words, the relatively rotatable rings that constitute the seal, although out of physical contact, effect satisfactory lubricant seal by reason of their proximity.

In the present disclosure, the inner bearing member 12 is the rotatable element of the bearing and it may be readily understood that lubricant within the bearing would be centrifugally forced toward the outer bearing member 11 and on no occasion of operation would flow contrary to this force to enable its passing out of the bearing through the labyrinth formed by the seal rings. Since the outer part of ring 23 is press fitted into a recess in the outer bearing member 11, the bead 28 conforming to the contour of this recess, there can be no leakage of lubricant at this point.

Although applicant has shown and described only one general form of the invention, it will be understood that variations in the structure of the sealing rings, to adapt them to bearings other than the one shown, may be made and are contemplated as being within the spirit and scope of the invention insofar as such variations are encompassed by the annexed claims.

Having thus set forth my invention, what I claim as new and for which I desire protection by Letters Patent is:

1. A seal adapted to span the space between a pair of relatively rotatable concentric members, one of said members having a marginally located annular recess radially facing the other of said members, said seal comprising a ring of resilient material having a bead portion fitting the walls of said recess under radial pressure and a wing portion extending axially therefrom adjacent said one member, a further resilient ring having a portion in sealing proximity with the other of said members and being radially spaced from the first mentioned ring, the space between said rings taking the form of an axially outwardly opening groove, a rigid annulus connecting said rings, the radial inner portion of said annulus being contoured axially outwardly to provide adequate lubricant space between said members, a peripheral, axially directed flange on said annulus bonded to said first ring, the lateral inner surface of said further ring fitting and being bonded to the lateral outer surface of the inner portion of said annulus, and a flanged metal ring having one flange thereof fixed to said other member and in sealing proximity with the sealing portion of said further resilient ring, another flange of said metal ring projecting into said groove in substantially uniformly spaced relation to the walls thereof.

2. A seal adapted to span the space between a pair of relatively rotatable concentric members, one of said members having a marginally located annular recess radially facing the other of said members, said seal comprising outer and inner spaced apart rings of resilient material, a bead portion of said outer ring fitting the walls of said recess under radial pressure, a wing portion extending axially therefrom adjacent said one member, a rigid annulus, an axial flange defining the outer periphery of said annulus and providing a seat for a radially innermost portion of said outer ring, said flange being bonded to said innermost portion and supporting said bead portion, axially offset portions continuing radially inwardly from said flange, the lateral inner surface of said inner ring being fitted and bonded to the lateral outer surfaces of said offset portions, and a flanged metal ring, one flange of said metal ring being fixed to said other member and the other flange thereof projecting into the space between said rings.

References Cited in the file of this patent

UNITED STATES PATENTS

| | | |
|---|---|---|
| 2,467,049 | Peterson | Apr. 12, 1949 |
| 2,639,954 | Potter | May 26, 1953 |
| 2,717,185 | Baumheckel | Sept. 6, 1955 |
| 2,755,113 | Baumheckel | July 17, 1956 |
| 2,819,100 | Peterson | Jan. 7, 1958 |